No. 725,154. PATENTED APR. 14, 1903.
W. J. SCOTT.
REIN SPREAD ROLLER.
APPLICATION FILED MAR. 19, 1902.
NO MODEL.
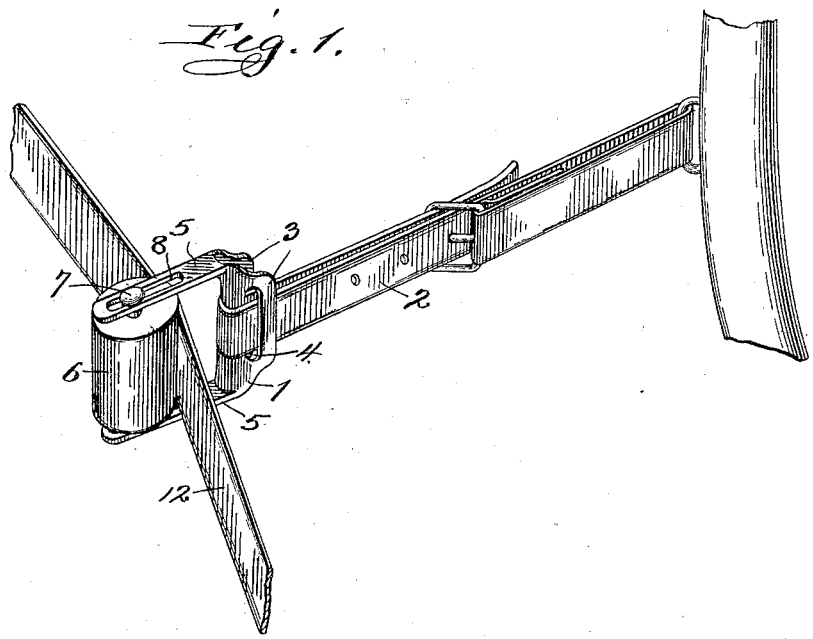
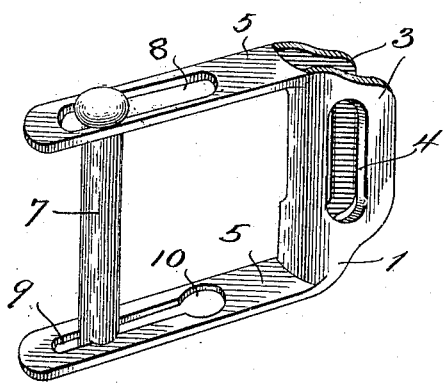
Witnesses:
R. J. Jacker
I. L. Weaver
Inventor:
William J. Scott.
By Walter N. Haskell.
Atty.

UNITED STATES PATENT OFFICE.

WILLIAM J. SCOTT, OF ROCKFALLS, ILLINOIS.

REIN SPREAD-ROLLER.

SPECIFICATION forming part of Letters Patent No. 725,154, dated April 14, 1903.

Application filed March 19, 1902. Serial No. 98,922. (No model.)

*To all whom it may concern:*

Be it known that I, WILLIAM J. SCOTT, a citizen of the United States, residing at Rockfalls, in the county of Whiteside and State of Illinois, have invented certain new and useful Improvements in Rein Spread-Rollers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to rein spread-rollers for harnesses and seeks to improve the devices of that class so as to render the operation thereof more perfect.

The novelty of my invention consists mainly in the means for securing the spread-roller in place in the support therefor and in the method of securing the roller-support to the spreader-strap, so as to prevent movement of such support thereon.

In the drawings, Figure 1 is a representation of my device in perspective. Fig. 2 is a detached view of the roller-support in perspective. Fig. 3 shows the roller-pin in detail.

1 is the usual roller-support, secured to the harness in the customary manner by a spreader-strap 2. To prevent the roller mechanism moving or jumping upon the strap 2, the support 1 is provided with two similar wings 3 3, each provided with a slot 4. The strap 2 is passed through one of the slots 4 from the rear, around the shank of the support 1, back through the other slot 4, and the end of the strap secured. This prevents any movement of the support upon the strap which would be likely to occur were the wings 3 not provided.

The support 1 is provided with arms 5 5, between which is supported the roller 6 by means of a roller-pin 7, secured in the support 1, as follows: The arms 5 5 are provided with slots 8 and 9, the slot 9 being provided at that end nearest the shank of the support with an enlarged portion 10. The pin 7 has near its small end, on opposite sides thereof, a reduced portion 11, adapted to be received in the slot 9, whereby such pin is held from release by engagement with the metal on each side of the slot on both faces thereof.

12 is a section of line supported by the roller.

To place the pin and roller in position, the pin is passed downwardly through the slot 8, roller 6, and enlarged portion 10 of the slot 9. The roller and pin are then moved toward the ends of the arms 5, locking the pin therein.

To secure the line in position, the support is detached from the strap 2, the roller and pin removed, and the line placed in position. The roller is then replaced and the support again attached to the strap. The distance between the roller 6 and the shank of the support is such that when the line 12 and strap 2 are both in position it is impossible for the pin 7 to be moved near enough such shank to effect the release of such pin. In other words, when the trap 2 is passed around the shank of the support 1 with the line 12 interposed it virtually locks the roller 2 against removal from the support. One thickness of strap does not prevent such removal of the roller, but two thicknesses do.

It is apparent that in order to remove the line from the support the strap 2 must first be detached, permitting the removal of the roller and consequent release of the line.

What I claim as my invention, and desire to secure by Letters Patent of the United States, is—

1. A device of the type set forth consisting of a support having arms, with elongated slots formed in each of the arms, one of said arms having an enlarged apertured portion merging into the said slot of that arm, a headed pin having reduced portions on opposite sides of its lower end, said reduced portions receiving the metal on each side of the last-named slot, and a roller mounted on said pin, substantially as described.

2. A device of the type set forth consisting of a support having arms each provided with elongated slots and, with one of the arms having an enlarged apertured portion merging into the slot of that arm, a pin headed on one end, and having reduced portions on its other end received within the latter-named slot, a roller on the pin, and rearwardly-extending ears secured to said support and having a vertical slot formed in each, said ears being spaced apart, substantially as described.

In testimony whereof I affix my signature in presence of two witnesses.

WILLIAM J. SCOTT.

Witnesses:
J. L. WEAVER,
F. A. GOULD.